(12) United States Patent
Van Dongen et al.

(10) Patent No.: US 8,676,444 B2
(45) Date of Patent: Mar. 18, 2014

(54) ALERTNESS MONITORING SYSTEMS AND ASSOCIATED METHODS

(75) Inventors: Hans Van Dongen, Spokane, WA (US); Pia Forsman, Helsinki (FI)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 13/989,494

(22) PCT Filed: Nov. 28, 2011

(86) PCT No.: PCT/US2011/062257
§ 371 (c)(1),
(2), (4) Date: Jun. 14, 2013

(87) PCT Pub. No.: WO2012/074935
PCT Pub. Date: Jun. 7, 2012

(65) Prior Publication Data
US 2013/0304326 A1    Nov. 14, 2013

Related U.S. Application Data

(60) Provisional application No. 61/417,870, filed on Nov. 29, 2010, provisional application No. 61/418,007, filed on Nov. 30, 2010, provisional application No. 61/496,638, filed on Jun. 14, 2011.

(51) Int. Cl.
| | | |
|---|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2011.01) |

(52) U.S. Cl.
USPC ............. 701/42; 701/41; 340/575; 340/576; 180/272

(58) Field of Classification Search
USPC .............. 701/36, 40, 41, 45, 58; 340/426.31, 340/465, 575, 576; 180/272
See application file for complete search history.

(56) References Cited

U.S. PATENT DOCUMENTS

| | | | |
|---|---|---|---|
| 4,604,611 A | * | 8/1986 | Seko et al. ............... 340/576 |
| 4,617,559 A | * | 10/1986 | Slansky .................... 340/576 |

(Continued)

FOREIGN PATENT DOCUMENTS

| | | |
|---|---|---|
| JP | 06107032 | 4/1994 |
| JP | 09011773 | 1/1997 |

(Continued)

OTHER PUBLICATIONS

International Search Report and Written Opinion issued Jul. 9, 2012, in International Application No. PCT/US2011/062257.

*Primary Examiner* — Rami Khatib
(74) *Attorney, Agent, or Firm* — Liang IP, PLLC

(57) ABSTRACT

Embodiments of driver alertness monitoring systems, devices, and associated methods based on steering variability and/or lane variability are described herein. In one embodiment, a method for detecting alertness of a driver operating a vehicle includes recording a steering position of the vehicle with a steering sensor and transmitting the recorded steering position to a processor. With the processor, the method also includes deriving a steering variability based on the recorded steering position of the vehicle over time, calculating a lane variability based on the derived steering variability and a transfer function of the vehicle, and estimating an alertness of the driver based on both the derived steering variability and the calculated lane variability.

20 Claims, 8 Drawing Sheets

(56) References Cited

U.S. PATENT DOCUMENTS

| | | | |
|---|---|---|---|
| 4,794,536 A * | 12/1988 | Eto et al. | 701/41 |
| 5,745,031 A * | 4/1998 | Yamamoto | 340/439 |
| 7,455,146 B2 * | 11/2008 | Brosig et al. | 180/272 |
| 2010/0109881 A1 | 5/2010 | Eskandarian et al. | |

FOREIGN PATENT DOCUMENTS

| | | |
|---|---|---|
| JP | 2001-219761 A | 8/2001 |
| KR | 10-2010-0080136 | 7/2010 |

\* cited by examiner

US 8,676,444 B2

ALERTNESS MONITORING SYSTEMS AND ASSOCIATED METHODS

CROSS-REFERENCE TO RELATED APPLICATION(S)

This application is a U.S. National Stage Application of PCT Application No. PCT/US11/062,257, filed Nov. 28, 2011, which claims priority to U.S. Provisional Application Nos. 61/417,870, filed on Nov. 29, 2010; 61/418,007, filed on Nov. 30, 2010; and 61/496,638, filed on Jun. 14, 2011.

BACKGROUND

Loss of alertness has been blamed for a large percentage of all road crashes. For example, loss of alertness is believed to cause up to twenty percent of all traffic accidents in Europe. In the U.S., falling asleep at the wheel is believed to cause at least 100,000 crashes annually. As many as twenty eight percent of polled American drivers have admitted to nodding off at the wheel at least once.

Various techniques have been studied to monitor a driver's driving performance and predict loss of alertness. Such techniques typically rely upon monitoring lane departure, large lateral deviations within a lane, cessation of steering corrections, and/or many other metrics of driving performance. However, no consensus is known regarding which metric or a combination of metrics is a more reliable indicator of driver alertness than other metrics.

DETAILED DESCRIPTION

Various embodiments of driver alertness monitoring systems, devices, and associated methods based on steering variability and lane variability are described below. As used herein, the term "alertness" generally refers to an operator's mental awareness and responsiveness. For example, alertness may be generally equivalent to vigilance and attention. When related to sleep loss or circadian misalignment, alertness may also be generally equivalent to arousal and opposite to sleepiness, tiredness, fatigue, and drowsiness. The term "steering variability" is used throughout to refer to a metric (or parameter) that represents a measure of steering position change of a vehicle over time. Similarly, the term "lane variability" is used throughout to refer to a metric that represents a measure of lateral lane position change of a vehicle over time. Examples of such metrics can include a standard deviation, variance, root mean square, average, additional metrics shown in Appendix A, and/or other suitable metrics. A person skilled in the relevant art will also understand that the technology may have additional embodiments, and that the technology may be practiced without several of the details of the embodiments described below with reference to FIGS. 1A-9.

As discussed in the Background section, loss of alertness can be a major contributor to traffic accidents and road crashes. Driver drowsiness, external distractions, operating mobile devices while driving, intoxication, illness, and/or other causes may lead to such loss of alertness. Even though various techniques have been developed to monitor and/or predict driver alertness, it is generally unknown which metric or a combination of metrics is a more reliable indicator of driver alertness than other metrics.

The inventors have recognized that a driver's driving performance can be principally explained by two driving metrics, i.e., steering variability and lane variability. By utilizing these metrics, monitoring systems may more reliably predict and/or indicate driver alertness than using other metrics. The inventors have also recognized that lane variability is statistically independent of, but can be derived from, steering variability. As such, components for measuring lane variability may be omitted in certain embodiments of the alertness monitoring systems discussed below, and thus reducing system complexities and costs over conventional monitoring systems.

Figure 1A:
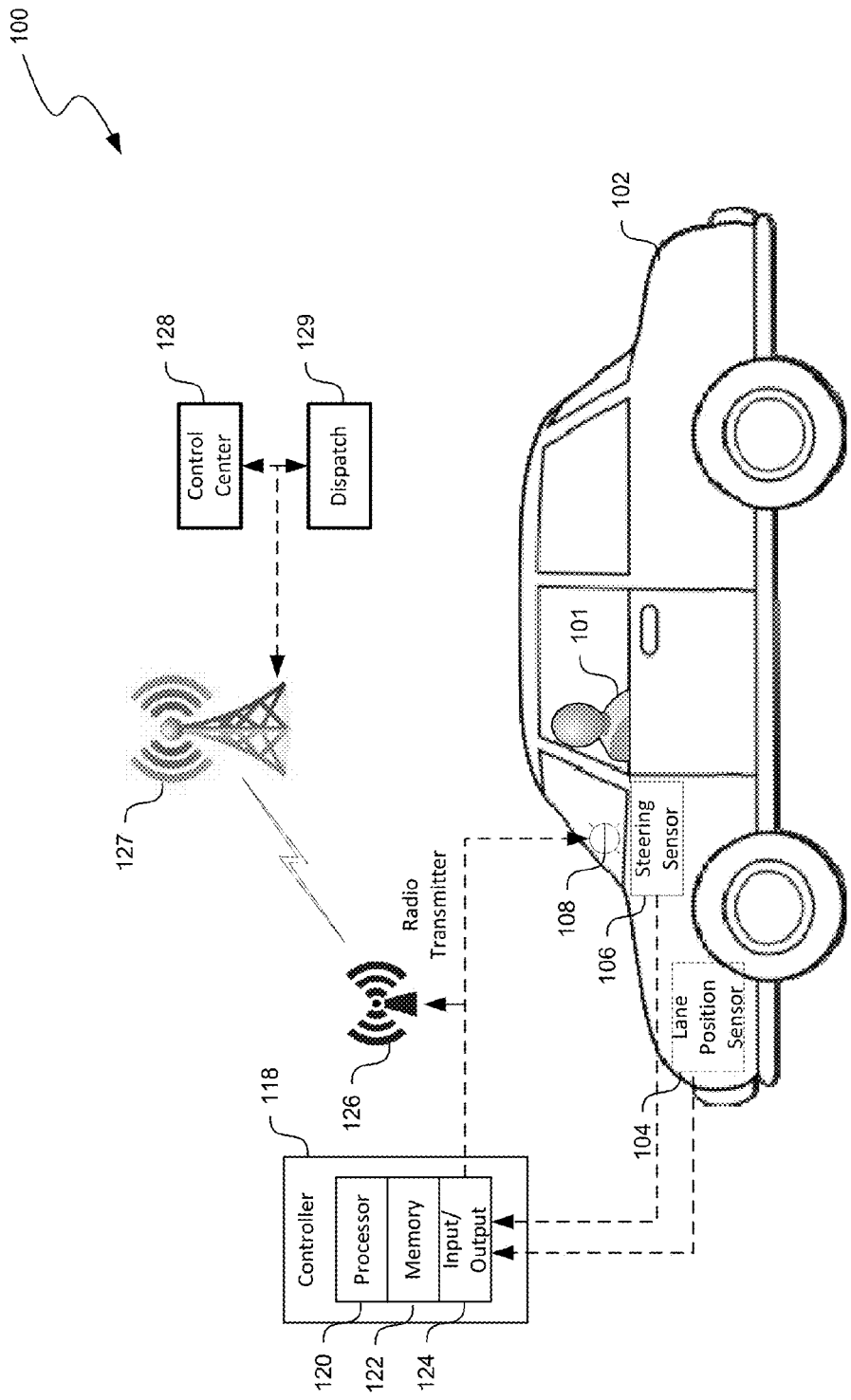
FIG. 1A is a schematic diagram of an alertness monitoring system for a vehicle in accordance with embodiments of the present technology.

FIG. 1A is a schematic diagram of an alertness monitoring system 100 in accordance with embodiments of the present technology. As shown in FIG. 1A, the alertness monitoring system 100 can include a steering sensor 106, an optional lane position sensor 104, a feedback component 108, and a controller 118 installed in a vehicle 102 with a driver 101. In the illustrated embodiment, the vehicle 102 is a passenger car. In other embodiments, the vehicle 102 may be a sport utility vehicle, a pickup truck, a commercial truck, a bus, an emergency vehicle, a tank, a tractor, and/or other suitable types of motorized vehicle. In further embodiments, certain components of the alertness monitoring system 100 (e.g., the controller 118) may be installed remotely from the vehicle 102, as described in more detail below with reference to FIG. 1B.

The steering sensor 104 can be configured to measure a steering wheel position of the vehicle 102. The steering sensor 104 may be installed on an input shaft proximate a gearbox (not shown) or at other suitable locations in the vehicle 102. In one embodiment, the steering sensor 104 may include a torque sensing element and a rotation sensing element. The torque sensing element may be configured to convert a steering torque input and/or direction into electrical or optical signals. The rotation sensing element may be configured to convert a rotation speed and/or direction into electrical or optical signals. The steering sensor 104 may also include an interface circuit (not shown) configured to convert the signals from the torque and rotation sensing elements into signals corresponding to a steering wheel position or change in steering wheel position of the vehicle 102. In other embodiments, the steering sensor 104 may include only one of the torque and rotation sensing elements, a steering angle sensing element, and/or other suitable sensing elements.

The optional lane position sensor 104 can be configured to monitor a current lane position and/or a lane position change of the vehicle 102. In one embodiment, the lane position sensor 104 includes a magnetic sensing element configured to detect magnetic markers (not shown) positioned on a roadway. In another embodiment, the lane position sensor 104 includes a global positioning system (GPS) with an electronic map. The lane position sensor 104 is configured to monitor a lane position of the vehicle 102 based on the current location of the vehicle 102 in relation to the electronic map. In yet another embodiment, the lane position sensor 104 includes a video camera and an image processor. The video camera is configured to capture a current view of the roadway in front of the vehicle 102. The image processor is configured to determine a lane position of the vehicle 102 based on the images captured by the video camera. In further embodiments, the lane position sensor 104 may include other suitable sensing and/or processing components. In yet further embodiments, the lane position sensor 104 may be omitted, and a lane position signal may be derived based on input from the steering sensor 106, as described in more detail below with reference to FIGS. 3 and 4. In at least one of the foregoing embodiments, the signal acquired by the optional lane position sensor 104 may be processed with a high pass filter to remove low-frequency variability associated with, for example, driving along curves. Such processing may occur at any suitable point along the signal processing chain.

The controller 118 can include a processor 120 coupled to a memory 122 and an input/output component 124. The processor 120 can include a microprocessor, a field-programmable gate array, and/or other suitable logic devices. The memory 122 can include volatile and/or nonvolatile computer readable media (e.g., ROM; RAM, magnetic disk storage media; optical storage media; flash memory devices, EEPROM, and/or other suitable non-transitory storage media) configured to store data received from, as well as instructions for, the processor 120. In one embodiment, both the data and instructions are stored in one computer readable medium. In other embodiments, the data may be stored in one medium (e.g., RAM), and the instructions may be stored in a different medium (e.g., EEPROM). The input/output component 124 can include a display, a touch screen, a keyboard, a track ball, a gauge or dial, and/or other suitable types of input/output devices configured to accept input from and/or provide output to the driver 101.

In certain embodiments, the controller 118 can include a computer operatively coupled to the other components of the alertness monitoring system 100 via a hardwire communication link (e.g., a USB link, an Ethernet link, an RS232 link, etc.). In other embodiments, the controller 118 can include a logic processor operatively coupled to the other components of the alertness monitoring system 100 via a wireless connection (e.g., a WIFI link, a Bluetooth link, etc.). In further embodiments, the controller 118 can include an application specific integrated circuit, a system-on-chip circuit, a programmable logic controller, and/or other suitable computing frameworks.

The feedback component 108 can be configured to provide a warning, prompt, and/or other types of information or cue to the driver 101. In the illustrated embodiment, the feedback component 108 includes a light. In other embodiments, the feedback component 108 can also include an in-vehicle indicator, a horn, an analog display, and/or other suitable output components configured to provide text displays, sounds, spoken warnings, interruptions of playing radio, and any combinations thereof. In further embodiments, the feedback component 108 may be integrated with the input/output component 124 of the controller 118.

Optionally, in certain embodiments, the alertness monitoring system 100 can also include a radio transmitter 126 operatively coupled to the input/output component 124 of the controller 118. The radio transmitter 126 may be configured to transmit sensor data, driving performance data, predicted driver alertness, alertness warning signals, and/or other driving information to a control center 128, a dispatch 129, and/or other suitable facilities via a radio tower 127 or other suitable communication channels. The radio transmitter 126 may be analog or digital on a radio band, cell phone band, satellite band, WIFI band, and/or other suitable frequency band. In other embodiments, the radio transmitter 126 may be omitted.

When the driver 101 is operating the vehicle 102, in one embodiment, the controller 118 samples the steering sensor 106 and the optional lane position sensor 104 for a steering position and a lane position of the vehicle 102, respectively. In certain embodiments, the steering sensor 106 is sampled at 72 Hz. In other embodiments, the steering sensor 106 may be sampled at 12 Hz, 24 Hz, 36 Hz, or other suitable frequencies. The optional lane position sensor 104 may be sampled at generally similar or different frequency as that of the steering sensor 106.

The acquired steering position and lane position data are transmitted to the controller 118 to derive a steering variability and a lane variability, respectively. Based on the derived steering variability and lane variability, the processor 120 estimates or predicts the alertness of the driver 101. In another embodiment, the steering sensor 106 monitors the steering position of the vehicle 102 with the optional lane position sensor 104 omitted. The acquired steering position is then transmitted to the controller 118 to derive the steering variability. Based on the derived steering variability and a relationship function (e.g., a vehicle-specific transfer function) between the steering variability and lane variability, the processor 120 derives the lane variability of the vehicle 102.

The processor 120 then estimates driver alertness based on both the steering variability and lane variability. In certain embodiments, the processor 120 may also estimate or predict driver alertness based on a calibrated or individualized alertness model stored in the memory 122 or remotely (e.g., from the dispatch 129). For example, the driving performance and alertness level of the driver 101 may be measured under controlled conditions. The collected alertness data may then be correlated with both the steering variability and lane variability to form an alertness model for the driver 101. In one embodiment, the alertness model may be calibrated to the driver 101 under various driving conditions, or may be tailored to the driver 101 based on other driver characteristics (e.g., trait drowsiness-proneness). In other embodiments, the alertness model may not be calibrated. In yet other embodiments, the processor 120 may estimate driver alertness based on vehicle speed, accelerator usage, vehicle yaw angle, angular velocity, and/or other suitable driving metrics in addition to or in lieu of steering variability and lane variability.

If the estimated alertness drops below a threshold stored in the memory 122, the controller 118 may indicate that the driver's alertness is inadequate and may provide an output to the feedback component 108 to initiate a warning. In certain embodiments, the feedback component 108 may provide one warning to the driver 101. In other embodiments, the estimated alertness may be compared to multiple thresholds, and different warnings may be initiated based on the comparison. Optionally, the controller 118 may transmit a warning signal to the control center 128 and/or the dispatch 129 via the radio tower 127. In response, the control center 128 and/or the dispatch 129 may communicate with the driver 101 via radios, cellular phones, and/or other suitable communication channels to verify the current condition of the driver 101. As a result, embodiments of the alertness monitoring system 100 may be incorporated into fleet management systems configured for driver shift scheduling, inventory and risk management, and/or other suitable tasks. In further embodiments, the control center 128 and/or the dispatch 129 may issue a remote command to the controller 118 to, for example, active a speed limiter, initiate remote control, or even terminate power of the vehicle 102.

In any of the embodiments above, the processor 120 may also actively control the operation of the vehicle 102 if the driver's alertness is determined to be inadequate. For example, the processor 120 may actively adjust the steering position based on the estimated and/or acquired lane position in order to maintain the vehicle 102 on a roadway. In another example, the processor 120 may instruct a braking mechanism (not shown) of the vehicle 102 to engage or activate a speed limiter. In further example, the processor 120 may control other operations of the vehicle 102 to improve and/or maintain driving safety.

Several embodiments of the alertness monitoring system 100 can more reliably predict driver alertness than conventional techniques. As discussed in more detail later, the inventors have conducted experiments with volunteers to study driving performance in relation to alertness levels. The inventors have recognized that the combination of steering variability and lane variability can explain about 47% of the total variance of driving performance, much greater than any other metrics considered. As a result, it is believed that the combination of steering variability and lane variability is the more, if not the most, reliable indicator of driver alertness.

Figure 1B:
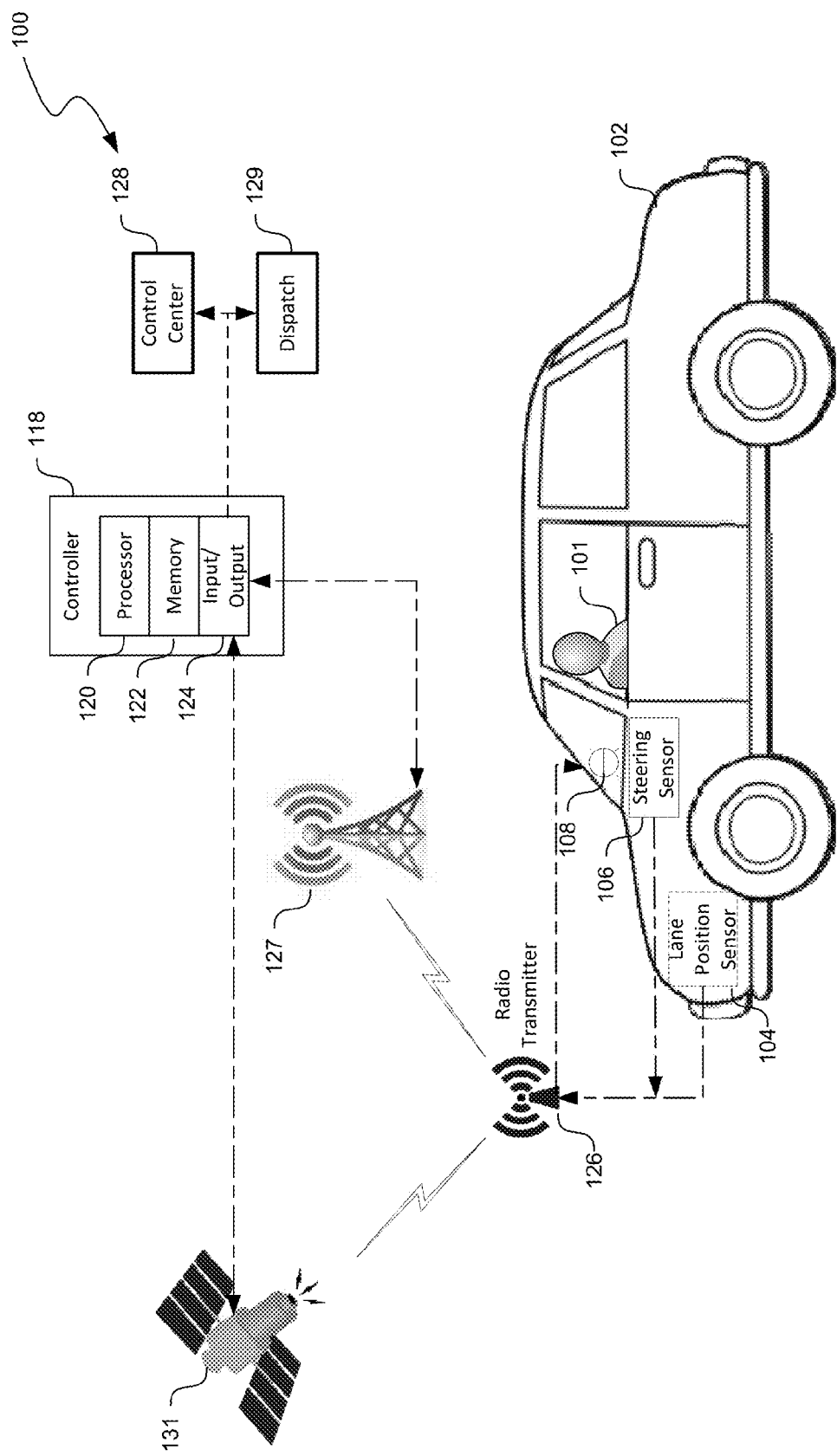
FIG. 1B is a schematic diagram of an alertness monitoring system for a vehicle in accordance with additional embodiments of the present technology.

Even though the alertness monitoring system 100 is shown in FIG. 1A as carried by the vehicle 102, in other embodiments, certain components of the alertness monitoring system 100 may be remote. For example, as shown in FIG. 1B, the controller 118 may be remotely coupled to the steering sensor 106 and the optional lane position sensor 104 via the radio transmitter 126. The controller 118 may be at the control center 128, the dispatch 129, or another suitable location.

In operation, the steering sensor 106 and the optional lane position sensor 104 monitor a steering position and an optional lane position of the vehicle 102, respectively. The transmitter 126 then transmits the acquired data to the controller 118 via a radio tower 127, a satellite 131, and/or other suitable communication channels. The controller 118 then processes the received data and provides an output to the feedback component 108 via the same or different communication channels, as discussed above with referenced to FIG. 1A.

Figure 2:
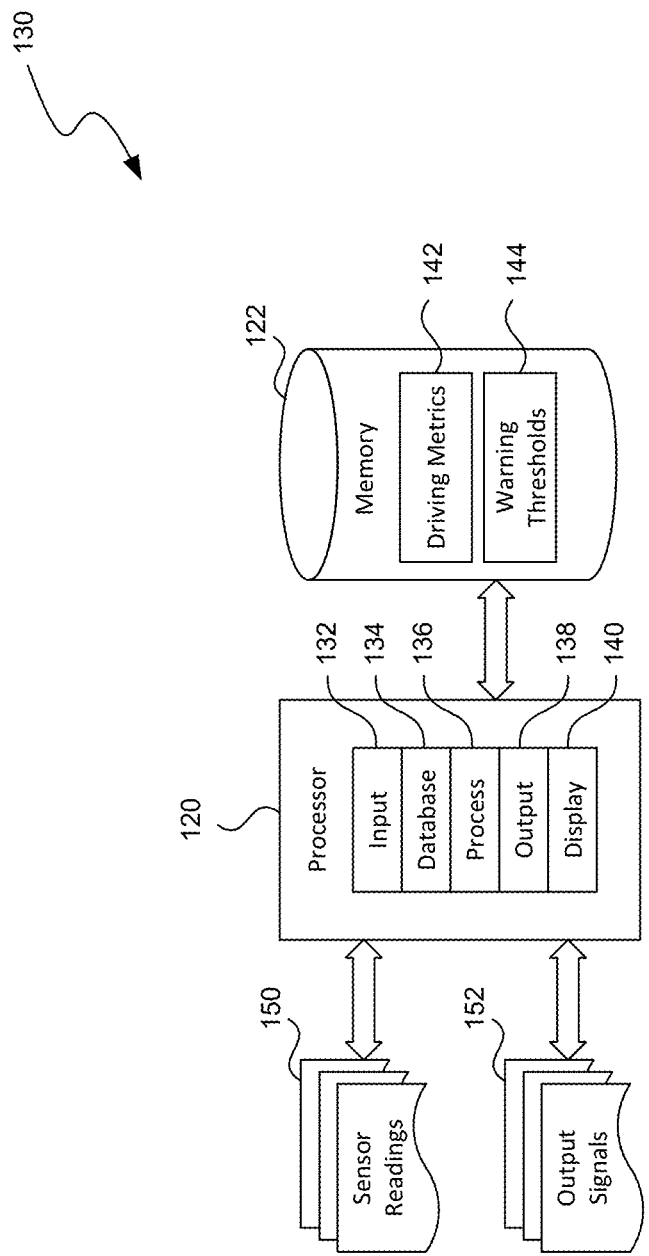
FIG. 2 is a block diagram showing computing system software modules suitable for the alertness monitoring system of FIG. 1A or 1B in accordance with embodiments of the present technology.

FIG. 2 is a block diagram showing computing system software modules 130 suitable for the controller 118 in FIG. 1A or 1B in accordance with embodiments of the present technology. Each component may be a computer program, procedure, or process written as source code in a conventional programming language, such as the C++ programming language, or other computer code, and may be presented for execution by the processor 120 of the controller 118. The various implementations of the source code and object byte codes may be stored in the memory 122. The software modules 130 of the controller 118 may include an input module 132, a database module 134, a process module 136, an output module 138, and, optionally, a display module 140 interconnected with one another.

In operation, the input module 132 may accept an operator input, such as control selections (e.g., warning acknowledgment) and sensor input (e.g., from the steering sensor 106 and the optional lane position sensor 104 in FIGS. 1A and 1B), and communicates the accepted information or selections to other components for further processing. The database module 134 organizes records, including driving metrics 142 (e.g., steering and/or lane variability) and optional warning thresholds 144, and facilitates storing and retrieving of these records to and from the memory 122. Any type of database organization may be utilized, including a flat file system, hierarchical database, relational database, or distributed database, such as provided by a database vendor such as the Oracle Corporation, Redwood Shores, Calif.

The process module 136 analyzes sensor readings 150 from sensors (e.g., from the steering sensor 106) and/or other data sources, and the output module 138 generates output signals 152 based on the analyzed sensor readings 150. The processor 120 optionally may include the display module 140 for displaying, printing, or downloading the sensor readings 150, the output signals 152, and/or other information via a monitor, a printer, and/or other suitable devices. Embodiments of the process module 136 are described in more detail below with reference to FIG. 3.

Figure 3:
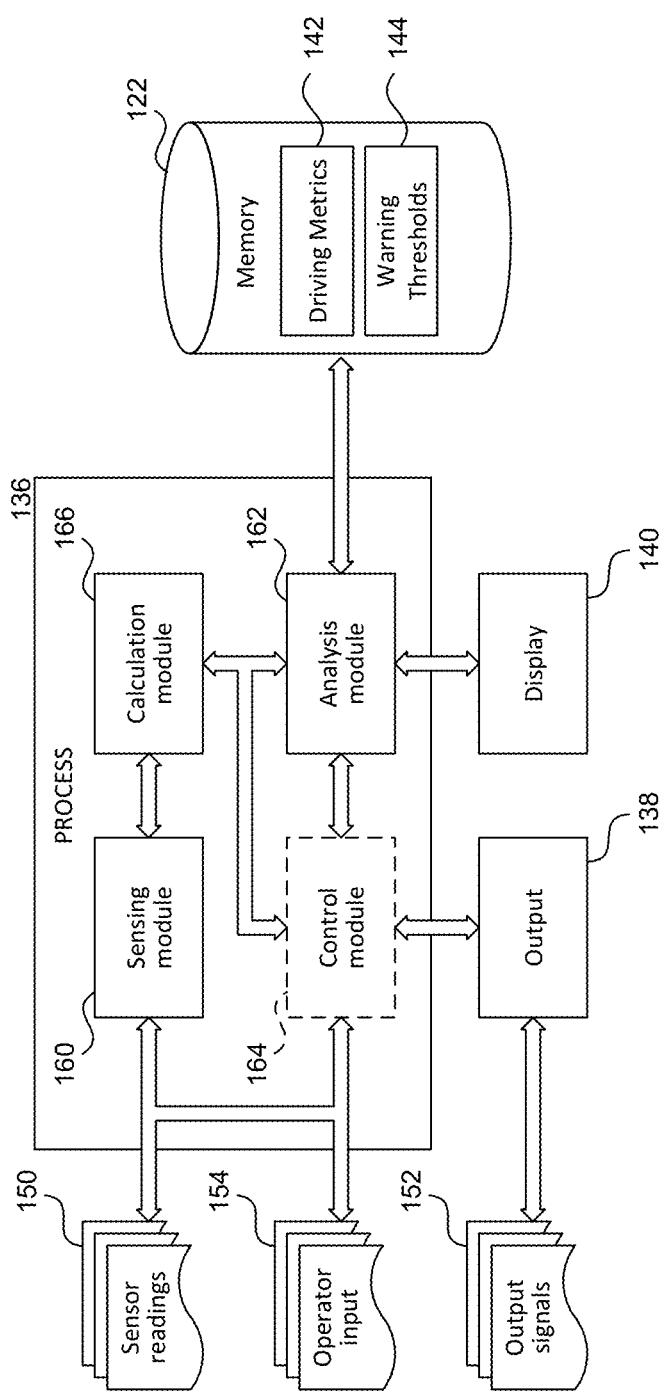
FIG. 3 is a block diagram showing software routines suitable for the process module of FIG. 2 in accordance with embodiments of the present technology.

FIG. 3 is a block diagram showing embodiments of the process module 136 of FIG. 2. As shown in FIG. 3, the process module 136 may further include a sensing module 160, an analysis module 162, an optional control module 164, and a calculation module 166 interconnected with one other. Each module may be a computer program, procedure, or routine written as source code in a conventional programming language, or one or more modules may be hardware modules.

The sensing module 330 is configured to receive and convert the sensor readings 150 into parameters in desired units. For example, the sensing module 160 may receive the sensor readings 150 from the steering sensor 106 (FIGS. 1A and 1B) as electrical signals (e.g., a voltage or a current) and convert the electrical signals into a steering angle, a steering angle change, and/or other suitable steering parameters. The sensing module 160 may have routines including, for example, linear interpolation, logarithmic interpolation, data mapping, or other routines to associate the sensor readings 150 to parameters in desired units.

The calculation module 166 may include routines configured to perform various types of calculation to facilitate operation of other modules. For example, the calculation module 166 may include counters, timers, and/or other suitable accumulation routines for deriving a standard deviation, variance, root mean square, and/or other metrics listed in Appendix A of the sensor readings 150.

In another example, the calculation module 166 may include a transfer function routine that derives a lane variability ($\Delta L$) based on steering variability ($\Delta S$) as follows:

$$\Delta L = H \times \Delta S$$

where H is a transfer function corresponding to a relationship between the lane variability and the steering variability. In the foregoing formula, H may be a mathematical expression that includes real and imaginary (i.e., complex) portions. In other examples, H may have other suitable forms of mathematical expression. Without being bound by theory, it is believed that the transfer function H is a property of the vehicle 102 (FIGS. 1A and 1B). As a result, the transfer function H may be determined via performance measurements, mechanical measurements, physics-based calculations of the vehicle 102, and/or a combination thereof.

In a further example, the calculation module 166 may include an alertness routine (or model) for estimating or predicting an alertness level (D) by combining instantiations of the steering variability ($\Delta S$) and lane variability ($\Delta L$). In one embodiment, the alertness routine may combine the steering variability ($\Delta S$) and lane variability ($\Delta L$) linearly as follows:

$$D = a\Delta L + b\Delta S$$

where a and b are lane coefficient and steering coefficient, respectively. In other embodiments, the steering variability ($\Delta S$) and lane variability ($\Delta L$) may be combined non-linearly (e.g., exponentially) and/or in other suitable fashion. In yet further embodiments, the alertness routine may incorporate the transfer function H such that the alertness may be estimated directly from steering variability alone. For example, the alertness routine may incorporate the transfer function H as follows:

$$D = a(H \times \Delta S) + b\Delta S = (aH+b)\Delta S$$

In other examples, the alertness routine may incorporate the transfer function H in other suitable fashions. In further embodiments, acceleration, speed, and/or other driving metrics measured or derived may also be incorporated into the alertness routine. Such driving metrics may be incorporated via linear or non-linear combinations of multiple metrics, combinations of new metrics derived from other signals, and/or combinations of the metrics (or transformations thereof) with additional metrics of the vehicle 102.

The analysis module 162 may be configured to analyze the estimated alertness from the calculation module 166 and to determine whether the driver alertness is adequate. In certain embodiments, the analysis module 162 may indicate that the driver alertness is inadequate when the estimated alertness is below a predetermined threshold. In other embodiments, the analysis module 162 may indicate that the driver alertness level is inadequate when the estimated alertness is below a predetermined threshold. In further embodiments, the analysis module 162 may indicate that the driver alertness level is inadequate based on other suitable criteria. The display module 140 may then receive the determined results for output to the driver 101 (FIGS. 1A and 1B).

The optional control module 164 may be configured to actively control the operation of the vehicle 102 (FIGS. 1A and 1B) if the analysis module 162 indicates that the driver alertness is inadequate. For example, the control module 164 may include a feedback routine (e.g., a proportional-integral or proportional-integral-differential routine) that generates one of the output signals 152 (e.g., a control signal of steering position) to the output module 138 based on the estimated or acquired lane position. In another example, the control module 164 may include a finite state machine that instructs a steering mechanism (not shown) of the vehicle 102 to ignore certain steering actions from the driver 101. In further example, the control module 164 may perform other suitable control operations to improve and/or maintain driving safety based on operator input 154 and/or other suitable input.

Figure 4:
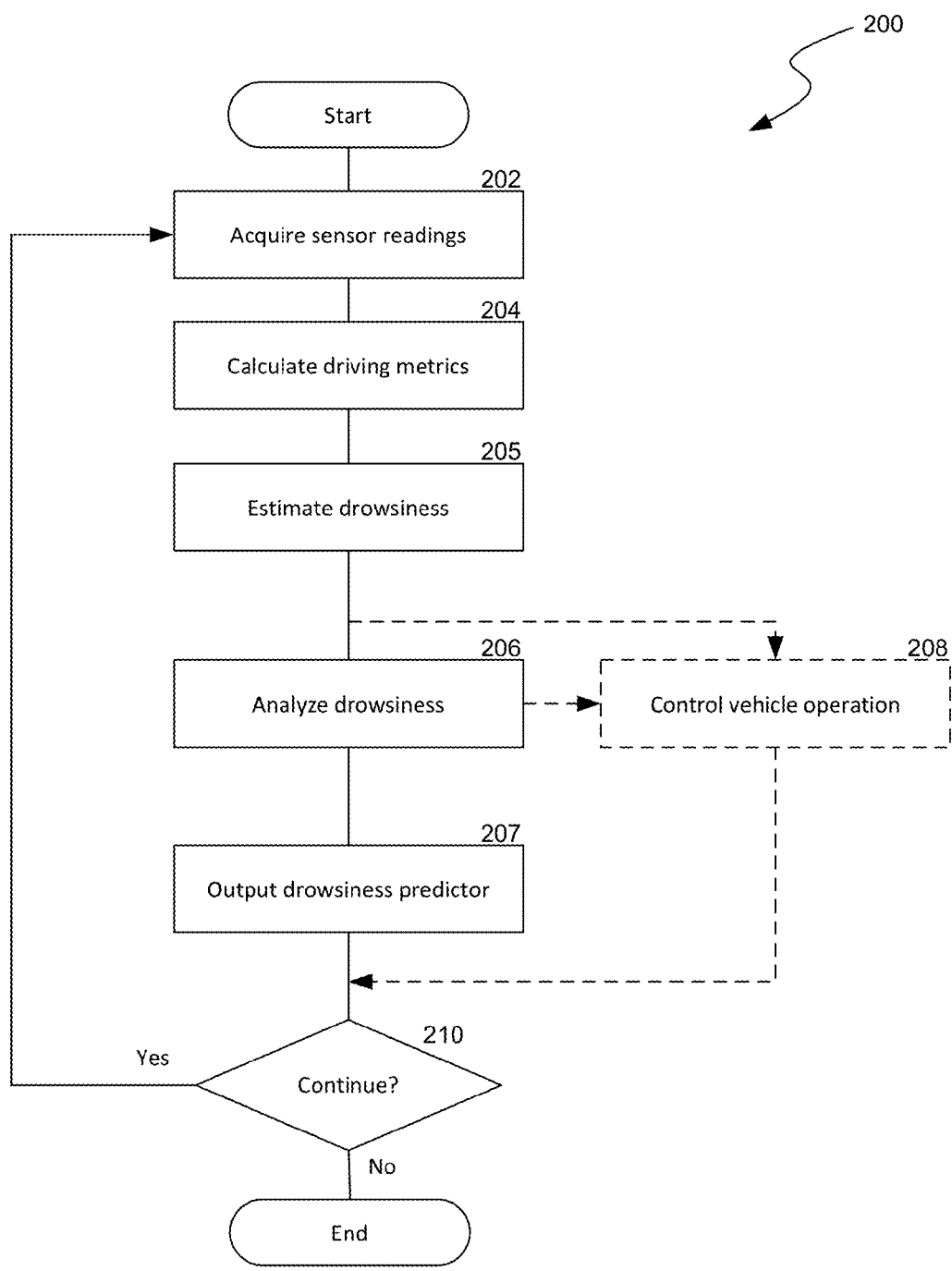
FIG. 4 is a flowchart showing a method for alertness monitoring in accordance with embodiments of the present technology.

FIG. 4 is a flowchart showing a method 200 for alertness monitoring in accordance with embodiments of the present technology. Even though the method 200 is described below with reference to the alertness monitoring system 100 of FIGS. 1A and 1B and the software modules of FIGS. 2 and 3, the method 200 may also be applied in other systems with additional or different hardware and/or software components.

As shown in FIG. 4, one stage 202 of the method 200 includes acquiring sensor readings of driving performance of the vehicle 102 (FIGS. 1A and 1B). In one embodiment, sensor readings from both the steering sensor 106 and the optional lane position sensor 104 (FIGS. 1A and 1B) are acquired. In other embodiments, only the sensor readings from the steering sensor 106 are acquired. In further embodiments, driving speed, accelerator usage, vehicle yaw angle, and/or other suitable readings may also be acquired via suitable sensors.

Another stage 204 of the method 200 includes calculating driving metrics based on the acquired sensor readings. In one embodiment, the calculated driving metrics include at least one of steering variability, lane variability, and/or other suitable driving metrics based on sensor readings from both the steering sensor 106 and the optional lane position sensor 104. In other embodiments, the lane variability may be calculated based on steering variability and a transfer function. Then, driver alertness may be estimated based on both the steering variability and lane variability and an alertness model at stage 205. In further embodiments, the alertness model may incorporate the transfer function of the steering variability and lane variability. As a result, driver alertness may be estimated based on the steering variability and optionally based on the alertness model.

Another stage 206 of the method 200 includes analyzing the alertness to determine whether a warning should be issued. In one embodiment, the estimated alertness is compared with a predetermined threshold or multiple graded thresholds. In other embodiments, the estimated alertness may be analyzed in other suitable fashions. Subsequently, the method 200 can include outputting a drowsiness predictor, a warning, and/or other suitable information at stage 207. Optionally, if a warning is issued, the method 200 includes controlling operation of the vehicle 102 (FIGS. 1A and 1B) as discussed above with referenced to FIG. 3.

The method 200 then includes a decision stage 210 to determine if the process should continue. In one embodiment, the process is continued if the vehicle 102 is still operating. In other embodiments, the process may be continued based on other suitable criteria. If the process is continued, the process reverts to acquiring sensor readings at stage 202; otherwise, the process ends.

The recognition that a driver's driving performance can be principally explained by the combination of steering variability and lane variability is based on two laboratory-based, high-fidelity driving simulator studies (referred to herein as study A and study B). The total acquired dataset included data from N=41 subjects. Study A contributed 25 subjects age 22 to 39 (mean±S.D.: 27.3±5.5; 13 men, 12 women); study B contributed 16 subjects age 22 to 39 (mean±S.D.: 27.5±5.6; all men). Inclusion criteria included good health (by physical examination, blood chemistry and questionnaires) and not a current smoker, good sleep (by baseline polysomnography, at-home actigraphy, sleep diary and questionnaires), no shift work or transmeridian travel within one month of entering the study, valid driver's license, and not susceptible to simulator adaptation sickness (by supervised test driving of a simulator). The studies were approved by the Institutional Review Board of Washington State University.

Both studies were controlled and in-residence laboratory studies. Subjects lived inside the laboratory for 14 days in study A and 16 days in study B. In study A, subjects were randomized to either a night shift condition (n=13) or a day shift condition (n=12). In study B, all subjects were assigned to a night shift condition equivalent to that of study A, except that the baseline and restart periods were each a day longer. In study A, the night shift condition began with a baseline day, which involved daytime wakefulness and nighttime sleep and included three sessions to practice test procedures. After the baseline day, subjects in the night shift condition had a daytime nap and were then exposed to 5 days of night shift, during which they had daytime sleep and nighttime wakefulness and took performance tests and drove a high-fidelity driving simulator at 21:00, 00:00, 03:00 and 06:00. After the 5-day shift work period, subjects were given a 34-hour break inside the laboratory, which involved two daytime naps and one nighttime sleep period and no performance testing. After the restart break, subjects were exposed to another 5 days of night shift, identical to the first 5 days. The night shift condition ended with a recovery day. The day shift condition of study A was equivalent to the night shift condition, except that during the two 5-day shift periods, wakefulness and testing occurred during the day and sleep was scheduled at night (and there were no daytime naps). Cumulative scheduled time for sleep for the day shift condition was identical to that for the night shift condition. In study B, there was only a night shift condition, which was equivalent to that of study A, except that the baseline and restart periods were each a day longer, both adding a nighttime sleep period and a daytime waking period without testing.

In both study A and B, during the two cycles of 5 days on night shift or day shift, subjects drove on the high-fidelity simulator and performed cognitive tests four times a day (time points 1 through 4). Each test session included a 10-minute psychomotor vigilance test, a 30-minute high-fidelity simulator driving session, and computerized versions of the Karolinska Sleepiness Scale and the digit-symbol substitution task. A total of 40 test sessions (i.e., 4 sessions per day times 5 days per shift cycle times 2 shift cycles) were conducted during each of the two studies.

In every driving session, subjects drove in a fixed-base and high-fidelity driving simulator (Model PatrolSim IV provided by L-3 Communications, Simulations Group, Salt Lake City, Utah), adapted for driving measurement purposes by installing additional hardware and software external to the simulator. The simulator used both hardware and software to simulate the mechanics and driving characteristics of an actual car.

Figure 5:
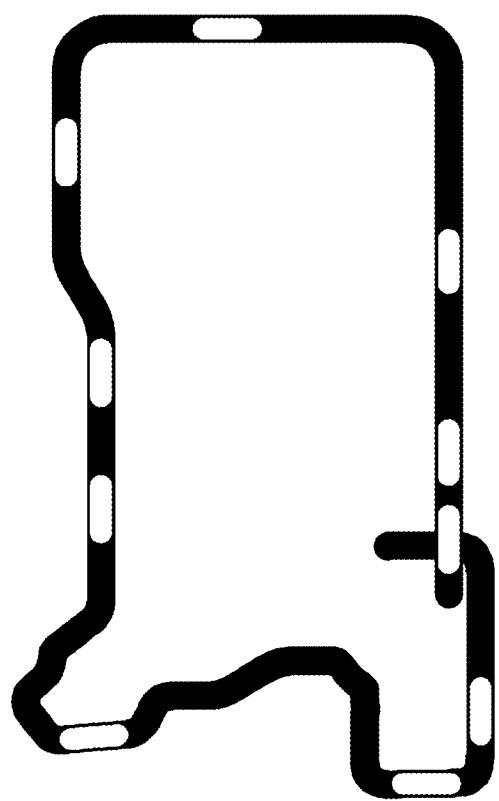
FIG. 5 is a schematic plan view of a test track used in experiments in accordance with embodiments of the present technology.

A standardized driving scenario was used. The driving scenario involved driving in daylight with a clear view on a rural highway without other vehicles. FIG. 5 shows a plan view of the track used during driving sessions. At fixed locations along the 28-mile track were ten 0.5-mile straight and uneventful road segments ("straightaways") shown in FIG. 5 as hollow segments. At five to seven other random locations, the driver encountered dogs or pedestrians crossing the track. The given speed limit was 55 mph, and completing the drive took about 30 minutes. Driving metrics obtained from the driving session are discussed below.

Each driving session was paired with cognitive performance tests yielding various indices of alertness. Immediately prior to driving, a 10-minute psychomotor vigilance test ("PVT") was administered. The PVT is a simple reaction time task with high stimulus density. The primary metric calculated was the number of lapses, defined as reaction times longer than 500 milliseconds. Immediately after driving, the Karolinska Sleepiness Scale ("KSS") and a 3-minute computerized digit-symbol substitution task ("DSST") were administered. In the KSS, subjects rated their sleepiness from 1 (very alert) to 9 (very sleepy). In the DSST, subjects were shown a key having randomized digits (1 through 9) associated with symbols. During testing, symbols were shown one at a time, and subjects typed the corresponding numbers. The primary outcome metric for the DSST was the total number of correct responses.

87 different driving metrics were extracted for the ten 0.5-mile straightaways in each driving session. The data were concatenated to form one time series per session for each subject. The 87 metrics are listed in Appendix A. The driving dataset of study A had 87,000 data points (25 subjects times 40 driving sessions times 87 metrics). The driving dataset of study B had 55,680 data points (16 subjects times 40 driving sessions times 87 metrics).

To reduce the dimensionality of the 87 metrics in each dataset, Principal Component Analyses ("PCA") with orthogonal varimax rotation was performed. Scree plots of eigenvalues were inspected and breaks or bends in the plots were identified to determine how many dimensions to retain before rotation in order to parsimoniously explain the variance in the dataset.

Factor scores of the retained principal components of study A were evaluated to examine sensitivity to alertness. Mixed-effects analysis of variance ("ANOVA") was performed with shift type (night vs. day) and time points (1 through 4) as fixed effects, and subjects as random effect on the intercept. Furthermore, the factor scores of the retained principal components were correlated with the indices of alertness in the study (i.e., PVT number of lapses, KSS sleepiness score and DSST number of correct responses), separately for the night shift condition and for the day shift condition.

Figure 6:
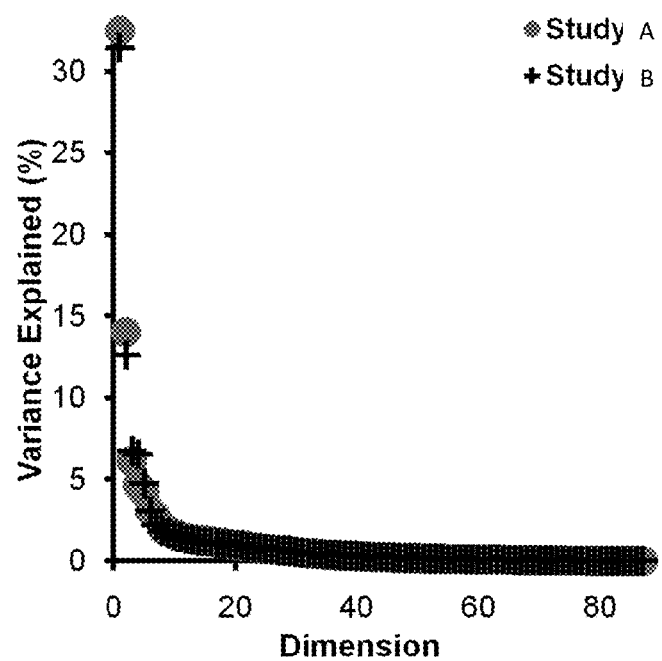
FIG. 6 is a Scree plot of percentage of driving variance explained versus component based on data acquired from experiments in accordance with embodiments of the present technology.

FIG. 6 is a Scree plot of percentage of explained variance in the driving metric datasets versus principal component based on data acquired from the two studies discussed above. As shown in FIG. 6, the Scree plot of eigenvalues for the PCA used to reduce the dimensionality of the 87 driving metrics indicated two dominant dimensions, which together explained about 47% of the total variance in the datasets of study A and B.

As shown in the table below, the first dimension exhibited high factor loadings on metrics of steering variability. In the study, the proportion of steering wheel movements exceeding three degrees in angle ("$STEX_3$") had the highest loading on this dimension, and other indices of steering wheel variability also showed high loading. The second dimension exhibited high factor loadings on metrics of lane variability. In the study, the standard deviation of lane position ("STD(L)") had the highest loading on this dimension, and other indices of variability in lateral lane position also showed high loading.

| Metric | Dimension 1 | Dimension 2 |
|---|---|---|
| $STEX_3$ (S) | 0.950 | −0.050 |
| $PHASE_{arc}$ (S) | 0.949 | −0.086 |
| $DEV_{mean}$ (S) | 0.949 | 0.074 |
| DEV (S) | 0.948 | 0.063 |
| STD (AV) | 0.945 | 0.067 |
| RMS (AV) | 0.944 | 0.067 |
| $DEV_{var}$ (S) | 0.917 | 0.076 |
| $PHASE_{area}$ (S) | 0.883 | 0.048 |
| E (S) | 0.863 | 0.026 |
| VAR (AV) | 0.790 | −0.065 |
| STD (L) | 0.049 | 0.914 |
| $DEV_{mean}$ (L) | 0.030 | 0.909 |
| DEV (L) | 0.020 | 0.902 |
| $DEV_{var}$ (L) | 0.015 | 0.856 |
| VAR (L) | 0.011 | 0.843 |

Figure 7:
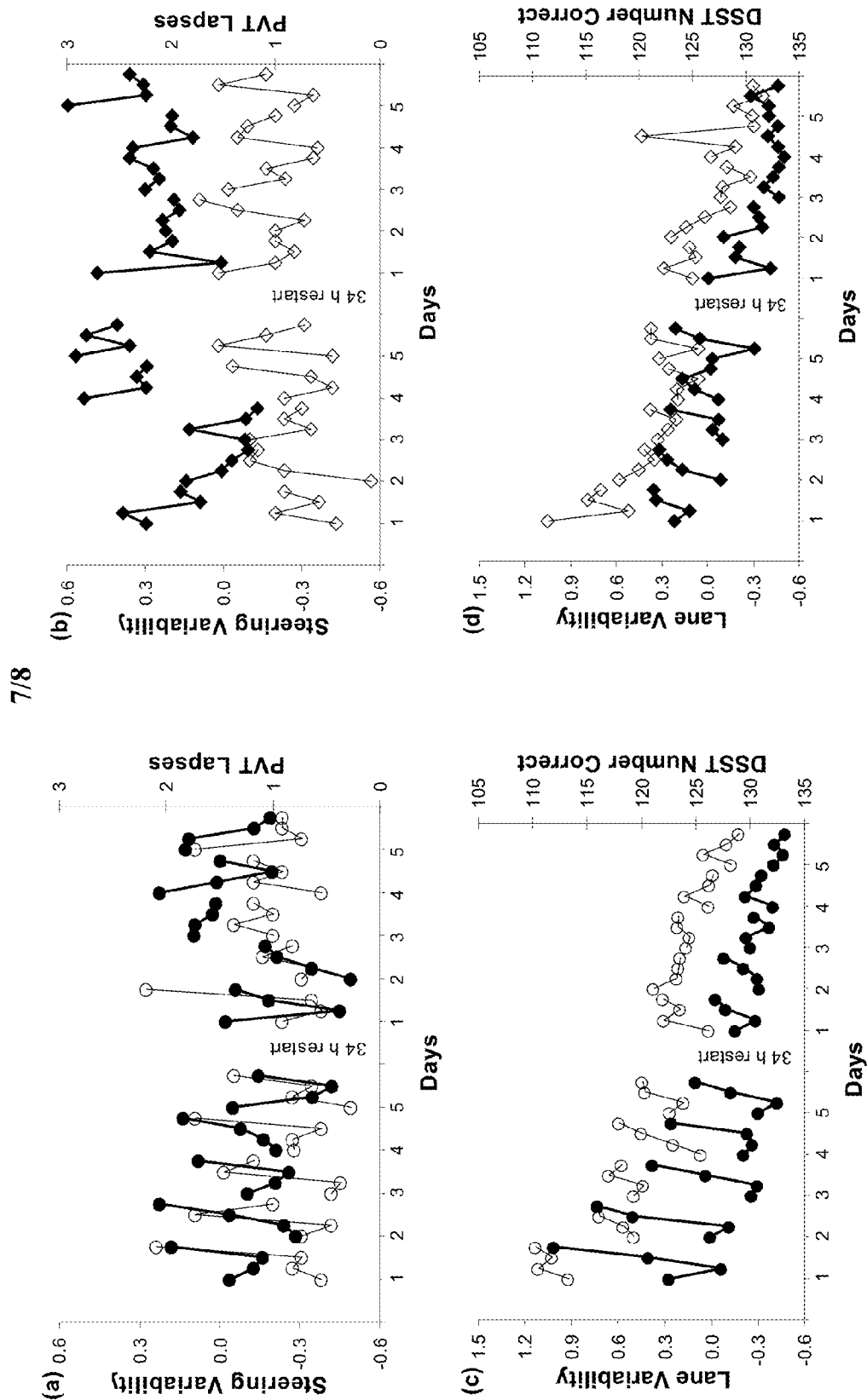
FIG. 7 shows plots of steering variability versus driver alertness based on data acquired from experiments in accordance with embodiments of the present technology.

FIG. 7 shows group-average factor scores of the two dominant dimensions for each condition of study A, plotted as a function of days and time of day within days. Mixed-effects ANOVA of the factor scores of steering variability revealed a significant effect of time point (F[3,940]=3.05, P=0.027) and a significant interaction of shift type by time point (F[3,940] =3.75, P=0.011). For lane variability, there was likewise a significant effect of time (F[3,940]=12.1, P<0.001) and a significant interaction of shift type by time point (F[3,940] =4.30, P=0.005).

FIG. 7 also shows group-average data for the indices of alertness in study A: PVT number of lapses, KSS sleepiness score, and DSST number of correct responses. The table below shows the correlations between these variables and the factor scores for steering variability (r), and the associated statistical significance levels (P). For the group-average data as well as the individual participants' data, significant correlations (P<0.05) were observed between steering variability and the number of lapses on the PVT in the night shift condition.

|  | Group averages | | | | Individual data points | | | |
|---|---|---|---|---|---|---|---|---|
|  | Night shift | | Day shift | | Night shift | | Day shift | |
|  | r | P | r | P | r | P | r | P |
| PVT lapses | 0.42 | 0.007 | 0.07 | 0.66 | 0.23 | <0.001 | 0.01 | 0.88 |
| KSS sleepiness | 0.21 | 0.18 | 0.07 | 0.66 | 0.05 | 0.31 | 0.04 | 0.38 |
| DSST number correct | 0.03 | 0.85 | 0.27 | 0.09 | 0.03 | 0.56 | 0.03 | 0.59 |

The table below shows the correlations between the indices of alertness in study A and the factor scores for lane variability (r), and the associated statistical significance levels (P). For the group-average data, significant correlations (P<0.05) were observed between lane variability and all three indices of alertness in the night shift condition.

|  | Group averages | | | | Individual data points | | | |
|---|---|---|---|---|---|---|---|---|
|  | Night shift | | Day shift | | Night shift | | Day shift | |
|  | r | P | r | P | r | P | r | P |
| PVT lapses | 0.44 | 0.005 | 0.25 | 0.12 | 0.32 | <0.001 | 0.02 | 0.69 |
| KSS sleepiness | 0.72 | <0.001 | 0.20 | 0.21 | 0.01 | 0.87 | 0.00 | 0.96 |
| DSST number correct | 0.79 | <0.001 | 0.77 | <0.001 | 0.36 | <0.001 | 0.30 | <0.001 |

Figure 8:
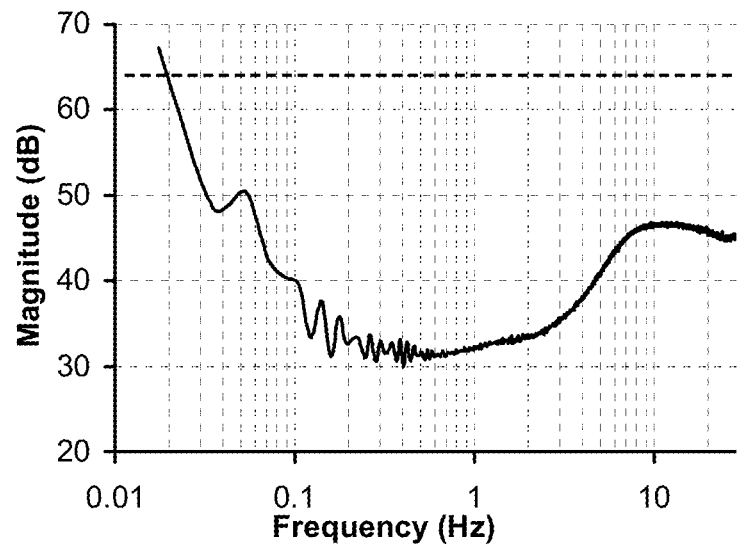
FIG. 8 shows a transfer function of steering position and lateral lane position in accordance with embodiments of the present technology.

The finding that steering-related and lane position-related metrics clustered on different dimensions indicated that these metrics were statistically independent of each other. However, one would expect them to be related as steering wheel movements should translate into lateral position changes on straightaways. A transfer function between the steering wheel position and the lateral lane position was derived, as shown in FIG. 8. FIG. 8 shows that a vehicle acts like a low pass filter that transfers steering wheel movements of relatively low frequencies to the wheels of the vehicle but considerably dampens the transfer of high frequencies steering wheel movements.

Figure 9:
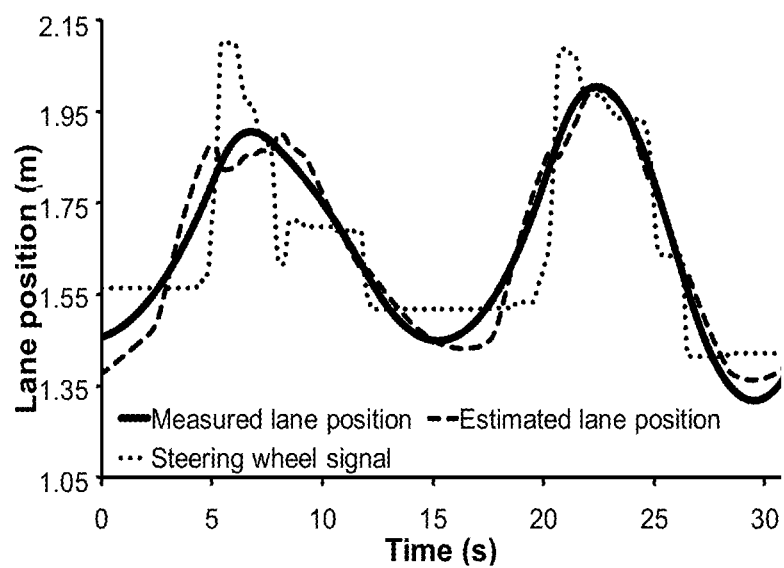
FIG. 9 is a plot of measured and estimated lane positions versus time in accordance with embodiments of the present technology.

Based on the transfer function shown in FIG. 8, an alertness monitoring system can calculate changes in lateral lane position from changes in steering position. The effectiveness of such calculation was examined by correlating the relative lane position derived from the steering wheel through the transfer function with the absolute lane position signal provided by the simulator software. As illustrated in FIG. 9, the average Pearson correlation coefficient for 10,000 pairs of relative and absolute lane position signals was r=0.88, which is quite high After relative changes in lane position were derived from the steering wheel position, the driving metrics using the relative lane position were recalculated. The metrics were validated by correlating them with those from the measured lane position signal. The table below shows that the average Pearson correlation between the metrics derived from the relative and absolute signals was r≥68, which is also quite high.

| Acronym | r |
|---|---|
| STD (L) | 0.80 |
| DEV$_{mean}$ (L) | 0.79 |
| DEV (L) | 0.78 |
| DEV$_{var}$ (L) | 0.68 |
| VAR (L) | 0.68 |

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

APPENDIX A

The table below shows certain metrics of driving performance. Column one defines metric acronyms. For example, STD stands for standard deviation. The letters in parentheses define which signals the metric was applied to. For example, L is lateral lane position; S is steering wheel angle; V is driving speed; A is accelerator usage; Y is car yaw angle; LV is lateral velocity; LA is lateral acceleration; and AV is angular velocity. Column two describes the individual metrics.

| Acronym (Signal) | Description |
|---|---|
| STD (L, LV, LA, A, V, S, AV) | Standard deviation of signal |
| VAR (L, LV, LA, A, V, S, AV) | Variance of signal |
| RMS (L, LV, LA, A, V, S, AV) | Root-mean-square of signal |
| MEAN (L, LV, LA, A, V, S, AV) | Average of signal |

-continued

| Acronym (Signal) | Description |
|---|---|
| SNR (L, LV, LA, A, V, S, AV) | Reciprocal coefficient of variation of signal variability |
| DEV (L, S) | Total signal deviation from windowed signal average |
| $DEV_{mean}$ (L, S) | Average signal deviation from windowed signal average |
| $DEV_{var}$ (L, S) | Variance of signal deviations from windowed signal average |
| MCF (L, S, Y) | Most common signal frequency |
| E (L, S, Y) | Signal energy or power |
| $TLC_6$ (L, V, S, Y) | Time to lane crossing within 6 seconds |
| $TLC_{60}$ (L, V, S, Y) | Time to lane crossing within 60 seconds |
| DOI ([LA, S], [Y, S]) | Degree of interaction between signals |
| SWDR (S) | Number of steering wheel direction reversals |
| $STEX_{0.3}$ (S) | Percent of signal amplitudes exceeding 0.3° |
| $STEX_3$ (S) | Percent of signal amplitudes exceeding 3° |
| $STEX_{30}$ (S) | Percent of signal amplitudes exceeding 30° |
| $STEX_{1std}$ (S) | Percent of signal amplitudes exceeding one standard deviation |
| $STEX_{2std}$ (S) | Percent of signal amplitudes exceeding two standard deviations |
| $MAXA_{right}$ (S, AV) | Maximum signal amplitude to the right |
| $MAXA_{left}$ (S, AV) | Maximum signal amplitude to the left |
| $CUMA_{right}$ (S) | Cumulative signal amplitude to the right |
| $CUMA_{left}$ (S) | Cumulative signal amplitude to the left |
| $A_{\%right}$ (S) | Percent of signal amplitudes to the right |
| $A_{\%left}$ (S) | Percent of signal amplitudes to the left |
| $MCA_{right}$ (S, AV) | Most common signal amplitude to the right |
| $MCA_{left}$ (S, AV) | Most common signal amplitude to the left |
| $MCA_{\%right}$ (S, AV) | Percent of signal amplitudes equaling $MCA_{right}$ |
| $MCA_{\%left}$ (S, AV) | Percent of signal amplitudes equaling $MCA_{left}$ |
| PHASE (S, AV) | Average radius in phase-plot |
| $PHASE_{arc}$ (S, AV) | Arc length of phase-plot |
| $PHASE_{area}$ (S, AV) | Area of phase-plot |
| PROB (S) | Probability of no steering movements |
| $PROB_{right}$ (S) | Probability of steering movements to the right |
| $PROB_{left}$ (S) | Probability of steering movements to the left |
| FD (S, A, V) | Fractal dimension of signal |
| $RT_{auto}$ (S) | Reaction time from signal autocorrelation |
| $RT_{cross}$ ([S, Y]) | Reaction time from signal cross-correlation |
| $SDEV_{mean}$ (V) | Average deviation from 55 mph |
| $SDEV_{std}$ (V) | Standard deviation of signal deviations from 55 mph |
| $SDEV_{snr}$ (V) | Reciprocal coefficient of variation of signal deviations from 55 mph |

We claim:

1. A method for detecting alertness of a driver operating a vehicle, comprising:
   recording a steering position of the vehicle with a steering sensor;
   transmitting the recorded steering position to a processor;
   with the processor,
      deriving a steering variability based on the recorded steering position of the vehicle over time;
      calculating a lane variability based on the derived steering variability and a transfer function of the vehicle; and
      estimating an alertness of the driver based on both the derived steering variability and the calculated lane variability.

2. The method of claim 1 wherein:
   recording the steering position includes recording a steering angle of the vehicle over time;
   deriving the steering variability includes deriving at least one of a standard deviation, variance, root mean square, average, percent of signal amplitudes exceeding 0.3°, percent of signal amplitudes exceeding 3°, and percent of signal amplitudes exceeding 30°;
   calculating the lane variability includes calculating a lateral lane position change based on the steering variability and the transfer function of the vehicle;
   estimating the alertness of the driver includes estimating an alertness of the driver based on the steering variability and the calculated lateral lane position change.

3. The method of claim 1, further comprising:
   retrieving a threshold from a memory operatively coupled to the processor; and
   if the estimated alertness exceeds the retrieved threshold, issuing a warning.

4. The method of claim 1 wherein estimating the alertness of the driver includes estimating an alertness of the driver based solely on a combination of the derived steering variability and the calculated lane variability.

5. The method of claim 1 wherein estimating the alertness of the driver includes estimating an alertness of the driver based on an alertness model with the derived steering variability and the calculated lane variability as input.

6. The method of claim 1 wherein estimating the alertness of the driver includes estimating an alertness of the driver based on an alertness model with the derived steering variability and the calculated lane variability as input, and wherein the alertness model is individualized for the driver.

7. A vehicle, comprising:
   a steering sensor;
   a processor operatively coupled to the steering sensor;
   a non-transitory computer-readable storage medium operatively coupled to the processor, the computer-readable storage medium containing instructions when executed, causing the processor to perform a method comprising:
      receiving data of steering position of the vehicle from the steering sensor;
      deriving a steering variability based on the received steering position of the vehicle over time; and
      estimating an alertness of a driver operating the vehicle based on an alertness model with the derived steering variability as input, the alertness model incorporating a transfer function between the steering variability and a lane variability.

8. The vehicle of claim 7 wherein the alertness model is configured to combine the steering variability (ΔS) and the lane variability (ΔL) linearly to derive an alertness value (D) as follows:

$$D = a\Delta L + b\Delta S$$

where a and b are lane coefficient and steering coefficient, respectively.

9. The vehicle of claim 7 wherein the alertness model is configured to derive an alertness value (D) based on the steering variability (ΔS) as follows:

$$D = a(H \times \Delta S) + b\Delta S = (aH + b)\Delta S$$

where a and b are lane coefficient and steering coefficient, respectively; H is the transfer function between the steering variability and the lane variability.

10. The vehicle of claim 7 wherein the alertness model is configured to combine the steering variability and the lane variability non-linearly to derive an alertness value.

11. The vehicle of claim 7, further comprising a feedback component operatively coupled to the processor, wherein the method performed by the processor further includes:
- determining whether driving performance of the driver is adequate based on the estimated alertness and a threshold stored in the computer-readable medium;
- if the driving performance of the driver is inadequate, performing at least one of the following:
  - causing the feedback component to issue a warning to the driver;
  - transmitting a warning signal to a control center and/or a dispatch;
  - actively controlling operation of the vehicle based on the steering variability and/or lane variability; and
  - initializing a speed limiter.

12. The vehicle of claim 7 wherein receiving the data of steering position of the vehicle includes receiving data of steering position of the vehicle from the steering sensor via at least one of a radio tower and a satellite link.

13. The vehicle of claim 7 wherein the processor is remote from the steering sensor.

14. The vehicle of claim 7, further comprising a lane position sensor operatively coupled to the processor.

15. A computer system for a vehicle, comprising:
- a sensing module configured to receive and convert sensor readings from a steering sensor into steering position data;
- a calculation module configured to derive a steering variability based on the steering position data from the sensing module and to derive a lane variability based on the steering position data and a transfer function between the steering variability and the lane variability for the vehicle, wherein the calculation module is also configured to estimate an alertness of a driver operating the vehicle based on the derived steering variability and the lane variability; and
- an analysis module configured to analyze the driver's current state of alertness based on the estimated alertness from the calculation module.

16. The computer system of claim 15 wherein:
- deriving the steering variability includes deriving a percent of signal amplitudes exceeding 3°, the signal being the steering position; and
- deriving the lane variability includes calculating a lateral lane position change based on the steering variability and the transfer function of the vehicle.

17. The computer system of claim 15 wherein the calculation module is configured to estimate the alertness of the driver based solely on a combination of the derived steering variability and the calculated lane variability.

18. The computer system of claim 15, further comprising:
- a database module configured to retrieve a threshold from a memory; and
- the analysis module is configured to compare the estimated alertness with the retrieved threshold and issue a warning output to a display module if the estimated alertness exceeds the retrieved threshold.

19. The computer system of claim 18, further comprising a control module operatively coupled to the calculation module and the analysis module, wherein, if the estimated alertness exceeds the retrieved threshold, the control module is configured to perform at least one of adjusting a steering operation of the vehicle based on the lane variability and initiating a speed limiter for the vehicle.

20. The computer system of claim 15 wherein the calculation module is configured to estimate an alertness of the driver based on an alertness model with the derived steering variability and lane variability as input, and wherein the alertness model is individualized for the driver.

* * * * *